US006968082B2

(12) United States Patent
Obrador

(10) Patent No.: US 6,968,082 B2
(45) Date of Patent: Nov. 22, 2005

(54) RESOLUTION DEPENDENT IMAGE COMPRESSION

(75) Inventor: Pere Obrador, Mt. View, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 732 days.

(21) Appl. No.: 09/948,207

(22) Filed: Sep. 6, 2001

(65) Prior Publication Data

US 2003/0044064 A1 Mar. 6, 2003

(51) Int. Cl.$^7$ .............................. G06K 9/00; G06K 9/36
(52) U.S. Cl. .................. 382/166; 382/232; 375/240.24
(58) Field of Search .................. 382/164, 166, 382/171, 173, 232, 240, 248, 250, 239, 279; 348/395.1, 403.1; 375/240.18, 240.19, 240.2, 240.24

(56) References Cited

U.S. PATENT DOCUMENTS 4,980,764 A * 12/1990 Henot ..................... 348/397.1
5,585,944 A * 12/1996 Rodriguez ................. 358/500
2001/0024293 A1 * 9/2001 Ville et al. ................. 358/1.15
2002/0191695 A1 * 12/2002 Irvine et al. ........... 375/240.03

OTHER PUBLICATIONS

Vaisey et al. in "Image Compression with Variable Block Size Segmentation," IEEE Transaction on Signal Processing, vol. 40, No. 8, Aug. 1992, pp. 2040–2060.*

* cited by examiner

Primary Examiner—Bhavesh M. Mehta
Assistant Examiner—Yubin Hung

(57) ABSTRACT

A method and system thereof for processing image data. Uncompressed image data comprising a plurality of pixels representing an image to be rendered are received. The pixels are grouped into blocks such that the pixels in a block have substantially the same color values. The image data including the blocks of pixels are compressed and the compressed data are used as the basis for generating a rendered image. The maximum number of pixels per block is dependent on the resolution at which the image may be rendered; at higher resolutions, more pixels are included in a block than at lower resolutions. However, the maximum physical dimensions of rendered blocks in the rendered image are not changed as a function of resolution; the maximum block size in an image rendered at one resolution is the same as that at another resolution.

21 Claims, 5 Drawing Sheets

RESOLUTION DEPENDENT IMAGE COMPRESSION

TECHNICAL FIELD

The present invention relates to a method and system for rendering images. More specifically, the present invention pertains to a method and system for processing data representing an image to be rendered.

BACKGROUND ART

Raster-based rendering devices include hard-copy print devices (for example, ink-jet or laser printers) as well as visual display devices (for example, display devices using cathode ray tubes or liquid crystal displays). These raster-based devices use a coding technique which codes picture elements (commonly referred to as pixels) into a digital data format. The amount of such data may be tremendous, and reductions in the amount of data are needed to compensate for limitations in input/output data rates and input/output buffer sizes. Data compression techniques are used to reduce the amount of data for storage and transfer. With raster data, the goal is to reduce the quantity of data without affecting the visual quality of the rendered image. Generally, the thresholds defining visual quality are established based on the capabilities of the human visual system.

Some techniques for compressing image data are based on the Joint Photographic Experts Group (JPEG) industry standard. However, the use of JPEG-based algorithms for compressing image data can be problematic for rendering "compound documents" (a document that includes both text and graphics). While the image data may be effectively compressed, text data may be visibly degraded even at relatively low levels of compression. Moreover, the effectiveness of JPEG-based compression is reduced when compressing image data that have been scaled using a pixel-replication scaling algorithm common to rasterized compound documents (e.g., 150 dot-per-inch image data scaled up to 300 or 600 dots-per-inch). Thus, JPEG-based techniques do not provide the best solution for compressing data in some applications, such as hard-copy printers.

Consequently, a faster raster-based data processing and compression technique useful for hard-copy printing, and also for visual displays, has been developed. This technique is described in U.S. Pat. No. 6,304,339, filed Nov. 16, 1998, by S. O. Miller et al., and entitled "Compound Document Page Data Processing," assigned to the assignee of the present invention and hereby incorporated by reference.

In essence, the technique used in the reference includes a pre-filtering stage in which the amount of image data is reduced by coalescing adjacent pixels having substantially the same color values into a pixel block which can then be compressed. A pre-defined filtering threshold is used to determine the number of pixels that can be coalesced into a block without degrading the quality of the rendered image. The filtering threshold defines a tolerance that is applied to the color values of adjacent pixels. Generally speaking, adjacent pixels whose color values may be different but still within the tolerance can be coalesced into a pixel block. The pixels in a block are effectively set to a single color value to enhance compressibility. Block sizes up to 8×4 pixels are created using the technique described in the reference.

While the referenced technique works well at image resolutions such as 600 dots-per-inch (dpi), it can have disadvantages at the higher image resolutions (1200 dpi, 2400 dpi, or more) coming into use. The amount of data for storage and transfer is increased at higher resolutions, and therefore it is desirable to achieve a higher rate of compression. In order to achieve higher compression rates using the referenced technique, it is necessary to set the filtering threshold very high. With a higher filtering threshold, larger differences in color values between adjacent pixels in an image are tolerated. Thus, for example, if the difference between the color of the image background and the color of an image object is close enough (within the tolerance established by the filtering threshold), adjacent pixels in the background and in the object may be included in the same block of pixels and treated as having the same color values. This may generate "jaggies" in the image border, degrading the quality of the rendered image.

Accordingly, what is needed is a method and/or system that can allow higher compression rates for higher resolution images without degrading the quality of the rendered image. The present invention provides a novel solution to the above needs.

DISCLOSURE OF THE INVENTION

The present invention provides a method and system thereof that can allow higher compression rates for higher resolution images without degrading the quality of the rendered image.

The present embodiment of the present invention pertains to a method and system for processing image data. An image is to be rendered at a particular resolution. Uncompressed image data comprising a plurality of pixels representing the image to be rendered are received. The pixels are grouped into blocks of pixels. One feature of the present invention is that the maximum number of pixels per block is dependent on the particular resolution at which the image may be rendered. According to the present invention, the maximum number of pixels that can be included in a pixel block is greater at higher resolutions than at lower resolutions.

For example, low frequency regions (e.g., plane areas such as image background) may include larger expanses of pixels in which there is little variation in color between adjacent pixels. In accordance with the present invention, these pixels may be grouped into larger blocks (relative to the conventional art).

The image data including the blocks of pixels are then compressed. Because a block can include more pixels, higher compression rates can be achieved, in particular in low frequency regions of the image. The compressed data are used as the basis for generating a rendered image (that is, the compressed data are decompressed, and the decompressed data are used to render the image).

Another feature of the present invention is that the physical dimensions (length and width in centimeters or inches, for example) of the maximum-sized blocks of pixels in the rendered image are not dependent on the resolution. That is, the maximum dimensions of a block rendered in an image at one resolution are the same as the maximum dimensions of a block in rendered image at another resolution although, as described above, at a higher resolution a block can contain a greater number of pixels than at a lower resolution. For example, at a print resolution of 1200 dots per inch (dpi), a block may contain 32×64 pixels, and at a print resolution of 600 dpi, a block may contain only 16×32 pixels, though in the printed image these blocks would be the same size (that is, they would have the same dimensions of length and width). It is appreciated that these numbers are used only to aid in the description of the example, and that they may or may not be typical of the number of pixels in a block.

In one embodiment, the image is rendered using a hardcopy print device and printed on a printable medium (e.g., paper). In another embodiment, the image is rendered as a visual display on a display device (e.g., a liquid crystal device or cathode ray tube).

The present invention allows higher compression ratios to be achieved in low frequency regions (e.g., image background) for high resolution images without a loss of detail in the high frequency regions (e.g., lines and edges of image objects). Also, with the use of constant dimensions for the maximum-sized blocks, the dimensions of blocks are not reduced at higher resolutions as in the conventional art. Accordingly, relative to the conventional art, fewer blocks are needed at higher resolutions to represent low frequency regions. Because there is overhead associated with each block, the overall amount of overhead is thereby reduced by the present invention. These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "grouping," "filtering," "compressing," "rendering," "outputting" or the like, refer to actions and processes (e.g., process 500 of FIG. 5) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1:
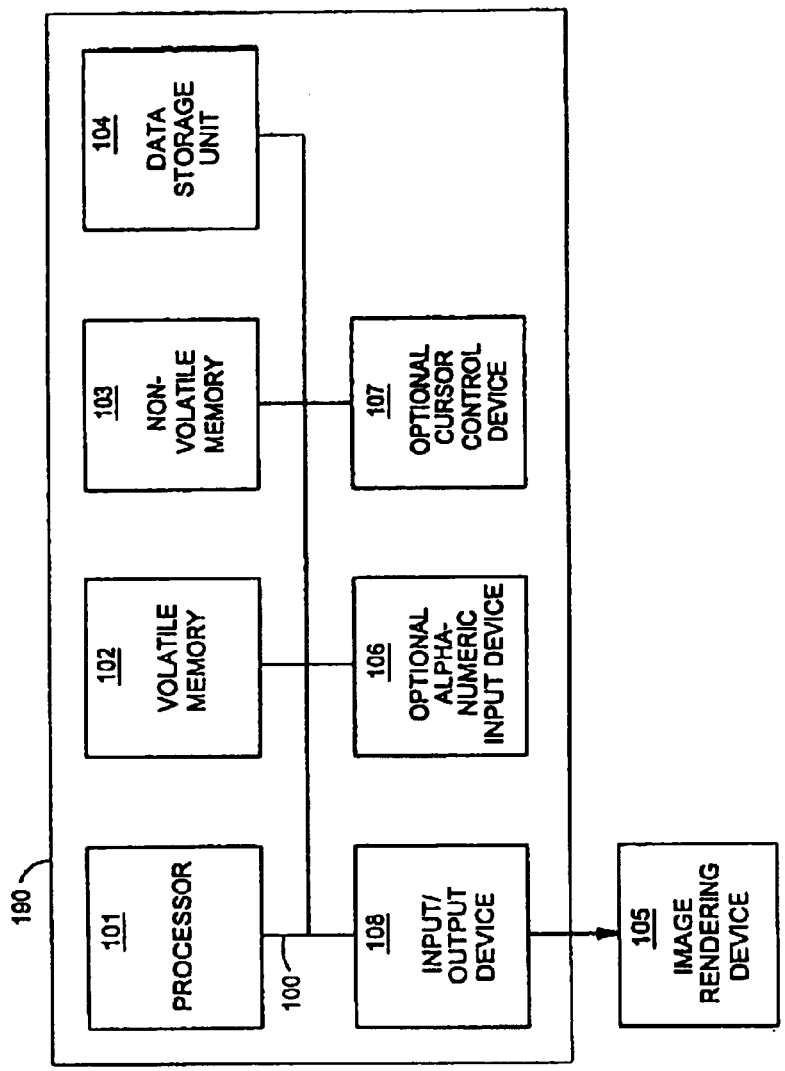
FIG. 1 is a block diagram of an exemplary device upon which embodiments of the present invention may be practiced.

Refer now to FIG. 1, which illustrates an exemplary device 190 upon which embodiments of the present invention may be practiced. In general, device 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101.

With reference still to FIG. 1, cursor control device 107 allows the computer user to dynamically signal the two-dimensional movement of a visible symbol (pointer) on a display screen of device 190. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

In one embodiment, image rendering device 105 is a liquid crystal device (LCD), cathode ray tube (CRT), or other display device suitable for creating graphic images and alphanumeric characters recognizable to the user. In another embodiment, image rendering device 105 is a hard-copy printer such as ink-jet or laser printer or the like. In general, image rendering device 105 is a device capable of generating a viewable image. It is appreciated that image rendering device 105 may be a device that is separate from device 190, or that it may be a device integrated with device 190 as a single unit. As a separate device, image rendering device 105 may be in a remote location relative to device 190; for example, image rendering device 105 may be coupled to device 190 via a wired or wireless network.

Device 190 also includes an input/output device 108, which is coupled to bus 100 for providing a physical communication link between device 190 and image rendering device 105. It should be appreciated that within the present embodiment, input/output device 108 provides the functionality to communicate information over a wired as well as a wireless communication interface. It should be further appreciated that the present embodiment of input/output device 108 is well suited to be implemented in a wide variety of ways. For example, input/output device 108 could be implemented as a modem.

Figure 2:
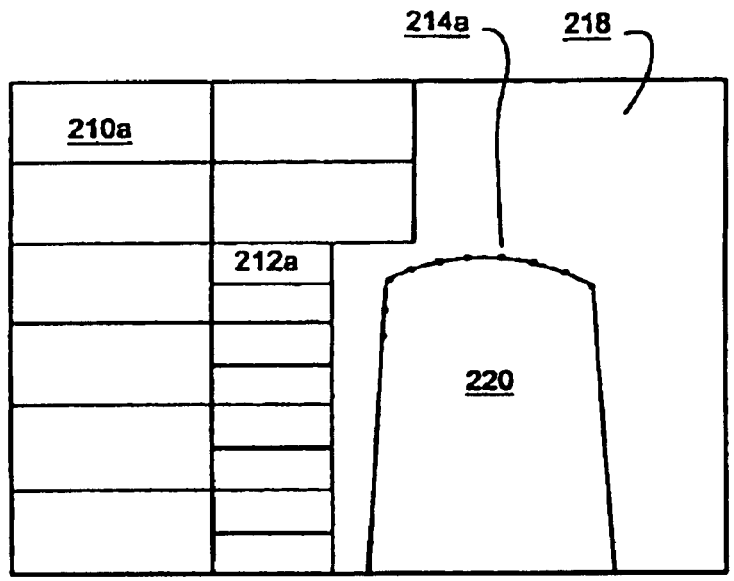
FIG. 2 illustrates an exemplary image rendered in accordance with one embodiment of the present invention.

FIG. 2 illustrates an exemplary image 200 rendered in accordance with one embodiment of the present invention. Image 200 may be rendered on a printable medium such as paper (including photograph quality paper), transparencies, mylar, or other suitable print media. Image 200 may also be rendered visually on a CRT, LCD or other suitable display device.

Image 200 represents a photograph quality image comprising an image object 220 and a background 218. However, it is appreciated that image 200 can be a compound document; that is, image 200 may include a combination of photographs, text and graphics. In the example of FIG. 2, background 218 is a plane area with relatively little variation in color. Image object 220 represents a more detailed object with relatively significant variations in color, texture, shading, and the like. It is understood that the image 200 is not drawn to scale.

In accordance with the present invention, before image 200 is rendered, the image data (pixels) are processed and compressed to reduce the amount of data that need to be transferred and stored. One technique for processing and compressing image data (including image data in compound documents) is described in U.S. Pat. No. 6,304,339, filed Nov. 16, 1998, by S. O. Miller et al., and entitled "Compound Document Page Data Processing," assigned to the assignee of the present invention and hereby incorporated by reference.

In the present embodiment, and as described in the reference, adjacent pixels are grouped into blocks of pixels. A pre-filtering stage reduces the amount of image data by coalescing adjacent pixels having substantially the same color values into a pixel block which can then be compressed. A pre-defined filtering threshold is used to determine the number of pixels that can be coalesced into a block without degrading the quality of the rendered image 200. The filtering threshold defines a tolerance that is applied to the color values of adjacent pixels. Generally speaking, adjacent pixels whose color values may be different but still within the tolerance can be coalesced into a pixel block. The pixels in a block are effectively set to a single color value to enhance compressibility.

In one embodiment, pairs of pixels are selected and their color values averaged if the color values are close enough to not significantly cause a degradation in the quality of the rendered image 200. Color values are considered to be close enough if they are within a predetermined tolerance that is selected based on the filtering threshold. The filtering threshold and hence the tolerance are functions of the resolution at which image 200 is to be rendered (refer to FIG. 3, below).

Continuing with reference to FIG. 2, pairs of pixels whose color values have been averaged are included in a 2×1 pixel block. The color values of these pixels are represented by a single set of color values. Adjacent 2×1 pixel blocks can be averaged with adjacent 2×1 blocks to form larger (e.g., 4×2) pixel blocks as long as the color values of the adjacent blocks are within the established tolerance. As the size of the pixel block grows, the tolerance is reduced to prevent the tolerance from being multiplied as the blocks grow in size.

Pixel blocks can be grown in this manner until the allowed tolerance is exceeded or until a maximum block size is reached. The maximum block size is measured in terms of the total number of pixels that can be included in a block. In accordance with the present embodiment of the present invention, the maximum number of pixels that can be included in a block is dependent on the resolution at which image 200 of FIG. 2 may be rendered. The maximum number of pixels that can be included in a block is greater at higher resolutions than at lower resolutions. However, the maximum size of a rendered pixel block in terms of its length and width is not dependent on resolution. That is, the maximum physical size of a rendered pixel block is constant at all resolutions. Additional information is provided in conjunction with FIG. 4, below.

With reference to FIG. 2, image 200 is rendered using a combination of maximum-sized pixel blocks exemplified by pixel block 210a, smaller pixel blocks exemplified by pixel block 212a, and pixel blocks that include only a single pixel as exemplified by pixel 214a. It is appreciated that there may be more than three sizes of pixel blocks; only three sizes are shown in FIG. 2 for simplicity of illustration. It is also appreciated that pixels as exemplified by pixel 214a are actually immediately adjacent to each other and are not spaced as shown in FIG. 2.

The maximum-sized pixel block 210a is typically used in the low frequency regions (e.g., image background 218) in which there is not a significant variation in color values, such that blocks can be grown to their maximum size using, for example, the technique described above. Smaller pixel blocks (e.g., 212a) are typically used where the variation in color values is such that pixel blocks cannot be grown to their maximum size. Smaller pixel blocks can also be used to fill the regions in which larger pixel blocks do not fit. Individual pixels (e.g., 214a) are typically used where finer details are required (e.g., a line or the edge of an image object such as object 220).

Figure 3:
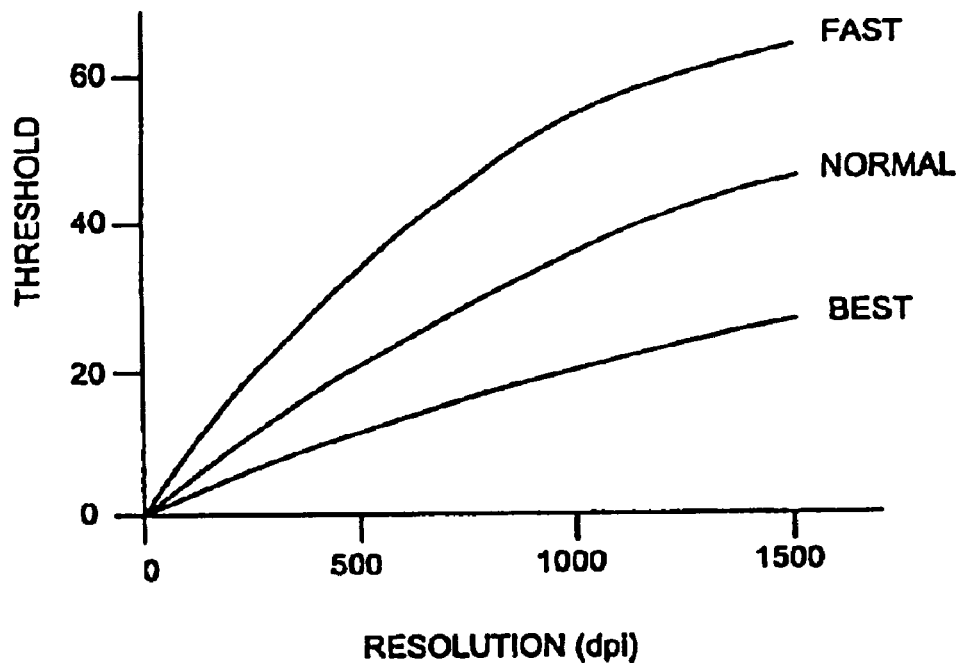
FIG. 3 is a graph illustrating the relationship between filtering threshold and image resolution in accordance with one embodiment of the present invention.

FIG. 3 is a graph 300 illustrating the relationship between filtering threshold and image resolution in accordance with one embodiment of the present invention. The information plotted in FIG. 3 is illustrative only, showing the relative relationship between threshold and resolution for various print modes (e.g., fast, normal and best).

In the present embodiment, image resolution is measured in dots-per-inch (dpi). While resolution measured in dpi may be typically characteristic of hard-copy printers, it is understood that information such as that provided in graph 300 can be extended to visual displays (e.g., CRTs, LCDs, etc.). For simplicity of discussion, graph 300 is discussed in the context of a hard-copy printer.

Threshold as a function of resolution is determined using image quality assessment tests (IQATs) that measure the response of the human visual system to differences between an original image and the image as rendered after processing and compression of the image data. The thresholds are determined for different images, original resolutions, and types of print media; other factors may be considered as well. Also, thresholds are determined for the different print modes that can be used; for example, a user may select print quality as "fast," "normal," or "best," with a corresponding tradeoff in throughput (print quality can also be automatically selected by the printer driver in some embodiments). The results of the IQATs are curves, one for each print mode, showing filtering threshold as a function of original image resolution. The filtering threshold defines the level at which artifacts in the rendered image can be detected by the human visual system. In accordance with the present embodiment of the present invention, filtering thresholds such as those illustrated in graph 300 are used to establish the tolerance for determining whether the color values for adjacent pixels (and adjacent pixel blocks) are close enough to allow them to be averaged, as described above in conjunction with FIG. 2.

Figure 4:
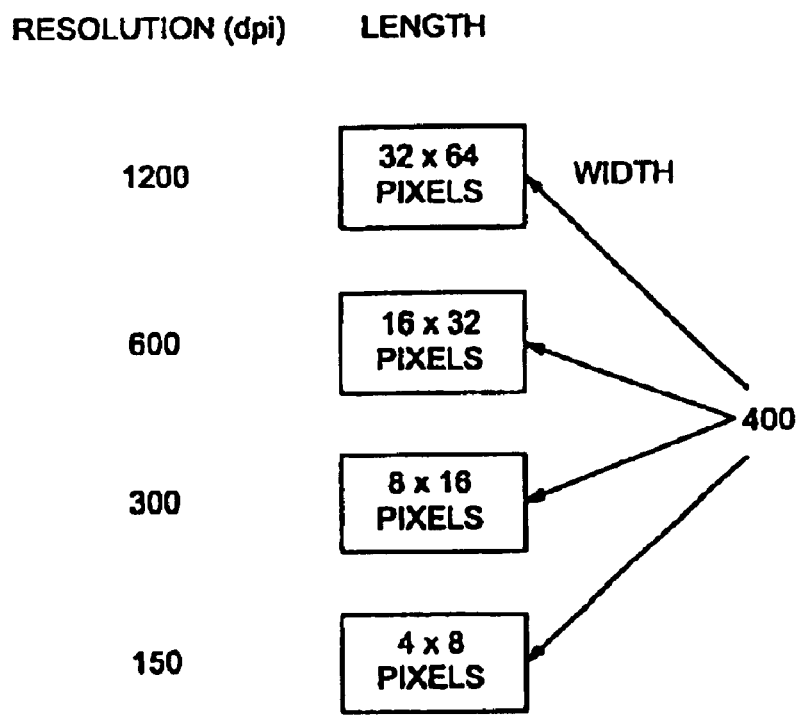
FIG. 4 is an illustration of pixel blocks at various image resolutions in accordance with one embodiment of the present invention.

FIG. 4 is an illustration of pixel blocks 400 at various resolutions (e.g., 150, 300, 600 and 1200 dpi) in accordance with one embodiment of the present invention. It is appreciated that the present invention is not limited to these resolutions. Pixel blocks 400 exemplify the maximum-sized pixel blocks as a function of resolution.

FIG. 4 illustrates two of the features introduced by the present invention. One of these features is that, as the resolution increases, the maximum number of pixels in the exemplary pixel blocks 400 also increases. The maximum number of pixels shown in the pixel blocks 400 is illustrative only; numbers of pixels different than those shown in FIG. 4 can be included in a pixel block. Also, the maximum number of pixels is shown as increasing by a factor of four for each change in resolution (for example, at 1200 dpi versus 600 dpi, four times as many pixels are included in a pixel block 400). However, different factors can be used depending on the results of the IQATs.

Typically, low frequency regions of an image (e.g., plane areas such as image background) may include larger expanses of pixels in which there is relatively little variation in color between adjacent pixels. Thus, in accordance with the present invention, these pixels may be grouped into larger blocks (more pixels) relative to the conventional art. Because a block can include more pixels, higher compression rates can be achieved, in particular in the low frequency regions of the image. The present invention does not change the minimum size of a pixel block (e.g., a block can include a single pixel), and blocks smaller than the maximum-sized block can be used to render an image as shown by FIG. 2 above. As such, the higher compression rates achieved with the present invention occur without a loss of detail in high frequency regions (e.g., lines and edges of image objects) typically represented by pixel blocks smaller than the maximum-sized pixel block.

Another of the features of the present invention is that, as the resolution increases, the physical dimensions (length and width as measured, for example, in centimeters or inches) of the real size (e.g., the size of the pixel block when it is rendered) of a maximum-sized pixel block 400 remains constant. That is, the physical size of the maximum-sized pixel block in the rendered image as viewed by the human visual system is the same at different resolutions. With the introduction of constant physical dimensions for the maximum-sized blocks, block size is not decreased when moving to higher resolutions, and therefore fewer blocks are needed at higher resolutions to represent low frequency regions. Because there is overhead associated with each block, the overall amount of overhead is thereby reduced by the present invention.

Figure 5:
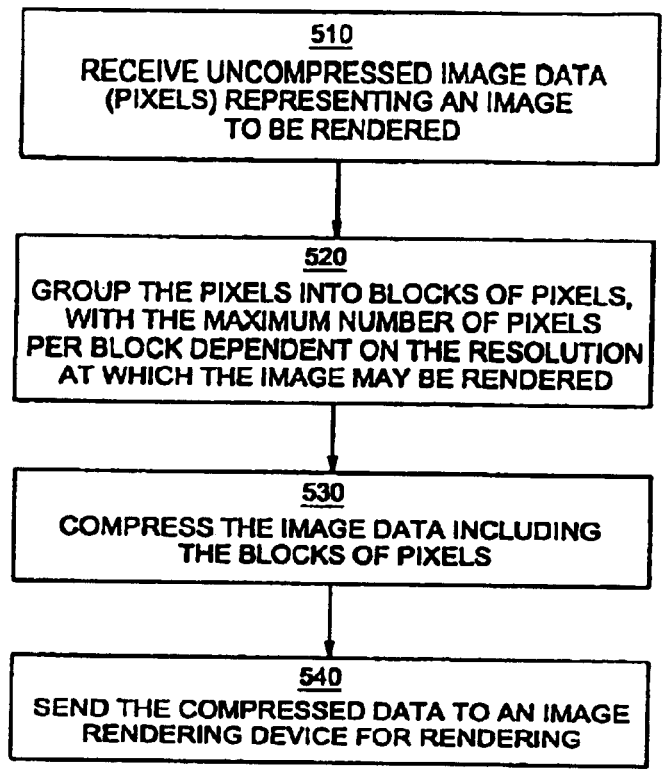
FIG. 5 is a flowchart of a method for processing image data in accordance with one embodiment of the present invention.

FIG. 5 is a flowchart 500 of a method for processing image data in accordance with one embodiment of the present invention. Flowchart 500 includes processes of the present invention which, in one embodiment, are carried out by a processor (e.g., processor 101 of FIG. 1) under the control of computer-readable and computer-executable instructions. The computer-readable and computer-executable instructions reside, for example, in data storage features such as computer usable volatile memory 102, computer usable non-volatile memory 103, and/or data storage device 104 of FIG. 1. The steps recited in flowchart 500 may be performed using, for example, a software driver installed on a device (e.g., device 190) that is integrated with image rendering device 105 of FIG. 1. Alternatively, the steps recited in flowchart 500 may be performed using a software driver installed on a device (e.g., device 190) separate from image rendering device 105, with the output then provided to image rendering device 105.

Although specific steps are disclosed in flowchart 500 of FIG. 5, such steps are exemplary. That is, the present invention is well suited to performing various other steps or variations of the steps recited in flowchart 500. It is appreciated that the steps in flowchart 500 may be performed in an order different than presented, and that not all of the steps in flowchart 500 may be performed.

In step 510, uncompressed image data (e.g., pixels) are received for the image to be rendered. The uncompressed image data may be part of a larger set of data representing a compound document page. In this latter case, the image data are extracted from the larger set of data.

In step 520, the pixels are grouped (coalesced) into blocks of pixels. In one embodiment, the pixels are grouped using a technique such as that described in the above-referenced patent application. In accordance with the present invention, the maximum number of pixels that can be included in a block of pixels is dependent on the resolution at which the image may be rendered. However, as described, the maximum physical dimensions of a block of pixels is independent of the resolution. The pixels in the block can be represented using the same color value or set of color values.

In step 530, the image data (the blocks of pixels) are compressed. In the case in which the image data are part of a larger set of data for a compound document, the image data are recombined with the rest of the data. In one embodiment, the pixels are compressed using a technique such as that described in the above-referenced patent application. U.S. Pat. No. 6,373,583, filed Nov. 16, 1998, by E. Wood et al., and entitled "Compound Document Page Data Compression," assigned to the assignee of the present invention and hereby incorporated by reference, also describes a compression technique that may be used.

In step 540, the compressed data are sent to an image rendering device. The compressed data can be decompressed and rendered by the image rendering device. In general, the image rendering device is a device capable of generating a viewable image, including a hard-copy (print) image and/or a visual (display) image.

It is appreciated that the image data may be processed for a particular resolution and sent to the image rendering device, then upscaled (or downscaled) by the image rendering device to the resolution at which the image will actually be rendered. For example, image data can be processed for a resolution of 600 dpi and sent to a printer, which may upscale the data to the desired printing resolution (e.g., 1200 dpi).

In summary, embodiments of the present invention provide a method and system thereof that can allow higher compression rates for higher resolution images without degrading the quality of the rendered image. The present invention allows higher compression ratios to be achieved in low frequency regions (e.g., image background) for high resolution images without a loss of detail in the high frequency regions (e.g., lines and edges of image objects). Also, the overall amount of overhead associated with image data is reduced by the present invention.

The preferred embodiment of the present invention, resolution dependent image compression, is thus described. While the present invention has been described in particular embodiments, it should be appreciated that the present invention should not be construed as limited by such embodiments, but rather construed according to the following claims.

What is claimed is:

1. A method for processing image data, said method comprising:
   receiving uncompressed image data comprising a plurality of pixels representing an image to be rendered;
   grouping said pixels into blocks of pixels, wherein there is a maximum number of pixels per block and wherein said maximum number of pixels per block is dependent on a resolution for rendering said image; and
   compressing image data comprising said blocks of pixels and outputting compressed image data, wherein maximum physical dimensions of a rendered block of pixels are substantially constant for different resolutions, such that maximum physical dimensions of blocks in a first image rendered at a first resolution and maximum physical dimensions of blocks in a second image rendered at a second resolution are substantially the same.

2. The method as recited in claim 1 comprising:
   sending said compressed image data to an image rendering device.

3. The method as recited in claim 2 wherein said image is printed on a print medium.

4. The method as recited in claim 2 wherein said image is displayed on a display device.

5. The method as recited in claim 1 wherein pixels in a block have characteristics satisfying a predetermined criterion.

6. The method as recited in claim 5 wherein said characteristics comprise color values, wherein said predetermined criterion represents a tolerance on color values such that pixels in a block have substantially the same color values.

7. The method as recited in claim 1 wherein said uncompressed image data are part of a larger set of data representing a compound document.

8. An apparatus for processing image data, said apparatus comprising:
   a memory unit; and
   a processor coupled to said memory unit, said processor for executing a method for processing image data, said method comprising:
      receiving uncompressed image data comprising a plurality of pixels representing an image to be rendered;
      grouping said pixels into blocks of pixels, wherein there is a maximum number of pixels per block and wherein said maximum number of pixels per block is dependent on a resolution for rendering said image; and
      compressing image data comprising said blocks of pixels and outputting compressed image data, wherein maximum physical dimensions of a rendered block of pixels are substantially constant for different resolutions, such that maximum physical dimensions of blocks in a first image rendered at a first resolution and maximum physical dimensions of blocks in a second image rendered at a second resolution are substantially the same.

9. The apparatus of claim 8 wherein said method comprises:
   sending said compressed image data to an image rendering device.

10. The apparatus of claim 8 wherein pixels in a block have characteristics satisfying a predetermined criterion.

11. The apparatus of claim 10 wherein said characteristics comprise color values, wherein said predetermined criterion represents a tolerance on color values such that pixels in a block have substantially the same color values.

12. The apparatus of claim 8 coupled to a hard-copy printer wherein said image is printed on a print medium.

13. The apparatus of claim 8 coupled to a display device wherein said image is displayed on said display device.

14. The apparatus of claim 8 wherein said uncompressed image data are part of a larger set of data representing a compound document.

15. A computer-usable medium having computer-readable program code embodied therein for causing a computer system to perform a method for processing image data, said method comprising;
   a) receiving uncompressed image data comprising a plurality of pixels representing an image to be rendered;
   b) grouping said pixels into blocks of pixels, wherein there is a maximum number of pixels per block and wherein said maximum number of pixels per block is dependent on a resolution for rendering said image; and
   c) compressing image data comprising said blocks of pixels and outputting compressed image data, wherein maximum physical dimensions of a rendered block of pixels are substantially constant for different resolutions, such that maximum physical dimensions of blocks in a first image rendered at a first resolution and maximum physical dimensions of blocks in a second image rendered at a second resolution are substantially the same.

16. The computer-usable medium of claim 15 wherein said method comprises:
   sending said compressed image data to an image rendering device.

17. The computer-usable medium of claim 16 wherein said image is printed on a print medium.

18. The computer-usable medium of claim 16 wherein said image is displayed on a display device.

19. The computer-usable medium of claim 15 wherein pixels in a block have characteristics satisfying a predetermined criterion.

20. The computer-usable medium of claim 19 wherein said characteristics comprise color values, wherein said predetermined criterion represents a tolerance on color values such that pixels in a block have substantially the same color values.

21. The computer-usable medium of claim 15 wherein said uncompressed image data are part of a larger set of data representing a compound document.

* * * * *